June 22, 1937.   C. FIELD   2,084,952
METHOD AND MEANS FOR REPAIRING HOLLOW BODIES
Filed July 21, 1934
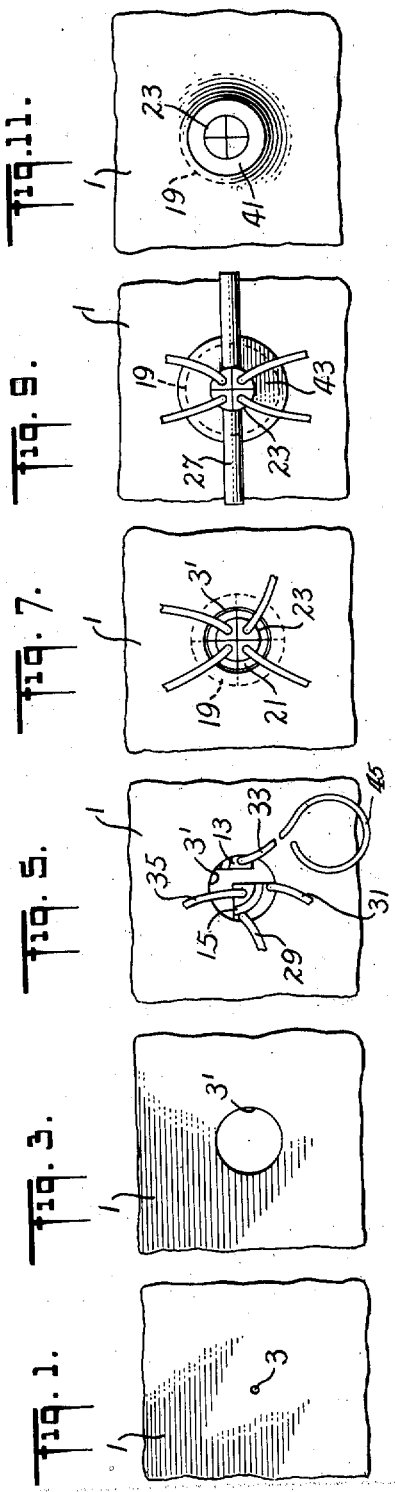
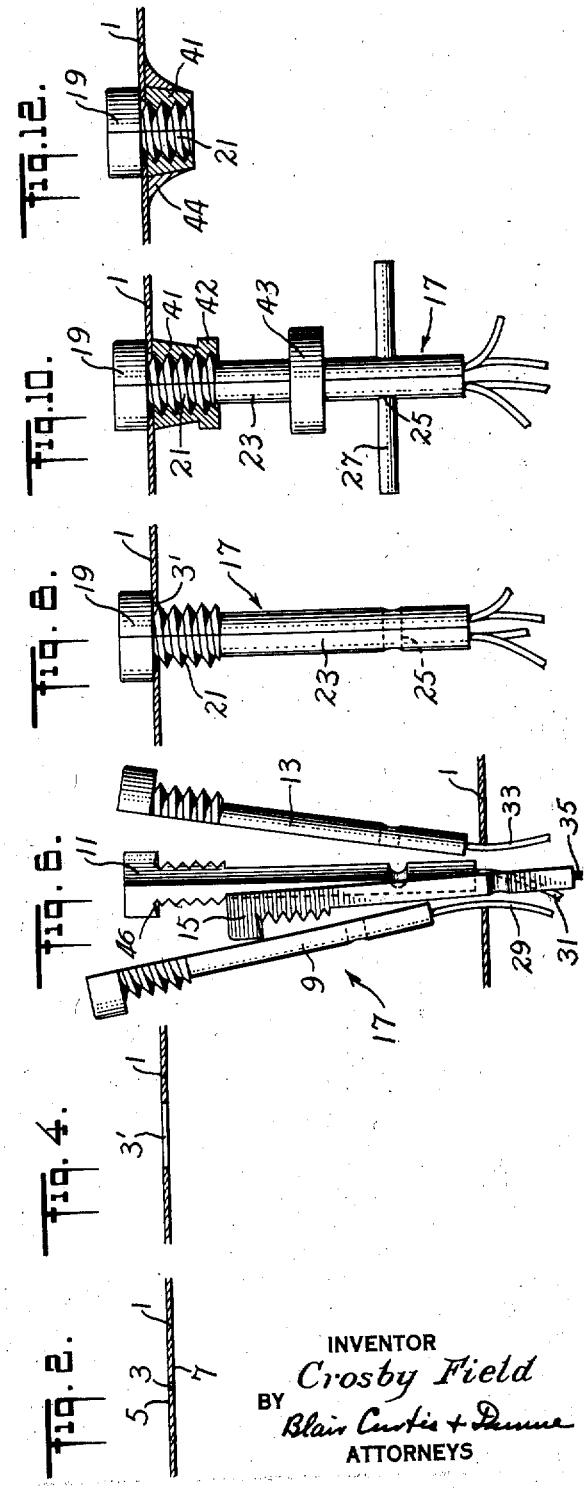
INVENTOR
Crosby Field
BY Blair Curtis + Dunne
ATTORNEYS Patented June 22, 1937

2,084,952

UNITED STATES PATENT OFFICE 2,084,952

METHOD AND MEANS FOR REPAIRING HOLLOW BODIES

Crosby Field, Brooklyn, N. Y., assignor to Flakice Corporation, Brooklyn, N. Y., a corporation of Delaware Application July 21, 1934, Serial No. 736,317

9 Claims. (Cl. 29—148.2)

This invention pertains to securing objects together, and relates more particularly to a method of, and means for securing an elongate object to edge portions of an opening formed in another object while working from one side only of the latter object.

For a specific embodiment I have chosen to describe my invention in its application to repairing hollow objects, such as cylinders, by stopping up holes existing in walls of such a cylinder. In the present embodiment such a hole or opening is repaired by filling the hole with a stud, and securing the stud to edge portions of the hole while working from one side only of the wall of the cylinder.

While the specific embodiment described in this specification shows a blank stud applied to an opening, in other embodiments of the invention, hollow tubular objects might be inserted in the openings and secured to the edge portions thereof.

In the accompanying drawing in which one embodiment of the invention is illustrated by way of example, Figures 1 through 12 illustrate certain of various steps which might be performed in carrying out the method of the present embodiment of the invention. (The figures bearing the odd numbers are outside plan views and the figures bearing the even numbers are vertical sections.) Figures 1 and 2 show a small pin hole accidentally existing in the wall of an otherwise fluid-tight hollow body;

Figures 3 and 4 show the hole of Figure 1 enlarged to a predetermined size;

Figures 5 and 6 show the hole of Figure 3 with stud forming elements wholly, or partly, inserted therethrough;

Figures 7 and 8 show the elements rearranged in the hole to form a stud engaging one side of the edge portion of the hole;

Figures 9 and 10 show the stud of Figure 7 with a nut threaded thereon and clamping with the stud the edge portions of the hole;

Figures 11 and 12 show the stud and nut of Figure 9 with excess portions removed and soldered to form a completed fluid-tight plug for the hole 3.

Referring to the drawing, Figures 1 and 2 show a portion of a wall 1 of, for example, a hollow cylinder fluid-tight except for a hole 3, having inside and outside edge portions 5 and 7 respectively. Now it may be desirable under certain conditions to plug such a hole while working from the outside only of the wall and in the present embodiment a method for such procedure is described.

As shown in Figures 3 and 4, the hole 3 is first enlarged to a predetermined size 3'. When thus enlarged a stud 17 (Figure 8), divided into sections 9, 11, 13 and 15 (Figure 6) is inserted through the enlarged hole by separately pushing the sections completely through the hole; each section having such overall transverse dimensions as to permit of the insertion of the sectors individually through the enlarged opening 3 from the outer side of the wall 1. Further, to the shank end of each section are attached flexible wires 29, 31, 33 and 35 by means of which the sections may be held and manipulated as they are inserted through opening 3'. As shown in Figure 3, to prevent the free ends of the wires from accidentally dropping through the hole 3', each free end has a loop such as indicated at 44, the diameter of which is greater than the diameter of the hole 3'.

The stud 17 is preferably provided with a head 19, and a shank. The segments of the head 19 may be somewhat undercut or recessed as best shown at 46 in Figure 6, thereby providing a sharp annular contact between the composite head 19 and the wall 1 when the parts are in final position. The shank has a threaded portion 21 and a reduced unthreaded portion 23 provided with a hole 25 adapted to receive a pin 27 (Figure 11) for purposes to be hereinafter described.

After the sections 11 to 15 have been inserted through the hole 3' they are manipulated and partially withdrawn therethrough by the flexible wires to form the stud 17, the inner edge portion of the hole holding adjacent sections in the desired lateral arrangement. As the sections are further withdrawn through the hole, the head 19 of the stud brings up against the inner edge portion 5 of the hole 3' and corrects the axial alignment of the respective sections to form the complete stud 17. A nut 41 is now slipped over the four flexible wires (the loops having been depressed), onto the shank and threaded thereonto. A collar 43 is next slipped over the unthreaded portion of the shank 23, and preferably has a relatively close engagement therewith. Next, pin 27 is inserted through the hole 25, and the shank 23 and head 19 are turned by means of pin 27 to tighten nut 41 on the shank to increase the clamping action of nut 41 and head 19 on the edge portions of the hole 3'. The collar 43 aids in keeping the desired arrangement of the sectors as torque is applied by pin 27.

The shank is now preferably cut off by sawing or other appropriate operation just below a raised collar 42 of the nut 41, as shown in Figures 10 and 12. Solder 44 of suitable type is preferably sweated around and into the shank and wall to hold and make the plug fluid-tight, as shown in Figure 12.

By following the operations described in the preceding paragraphs the hole 3 in the wall may be plugged or repaired while working only from the outside of the wall 1.

Also, plug 17 may be hollow as when it is desirable to tap the wall of a hollow cylinder to secure a tube or other pipe connection thereto.

As various embodiments might be made of this invention, and as various changes might be made in the construction herein described, all without departing from the scope of the invention, it is to be understood that all matter herein set forth or shown in the accompanying drawing is to be interpreted as illustrative and not in a limiting sense.

I claim:

1. The method of securing a stud to edge portions of a hole in a wall of a hollow body while working from one side only of the wall, comprising the steps of selecting a stud with a head every radius of which is greater than the largest radius of said hole, and with a shank of slightly less radius than the radius of the whole, dividing the stud into longitudinal sections of such size that the sections may individually be passed through the hole, partially withdrawing the sections through the hole to form the assembled stud and to bring the head of the stud against the inner edge portion of the hole to seal said hole, and applying clamping means over the stud to clamp the edge portions of the hole between the stud head and clamping means.

2. The method of attaching a stud to edge portions of a hole formed in a wall of a body while working from only one side of the wall, comprising selecting a stud having a head every radius of which is greater than the radius of the hole, and a threaded shank with a cross-section less than that of the hole, inserting said stud in parts, head first, through said hole, the transverse cross-sections of said parts being such that the parts individually may be passed through the hole, and partially withdrawing the parts through the hole to form the stud until the head thereof engages the inner edge portion of the hole to seal said hole, and applying a nut to the threaded shank to engage the outer edge portion of said hole.

3. The method of attaching a body to a thin metal wall while working from one side only of the wall, comprising the steps of forming a hole of predetermined dimensions through the wall, of selecting a headed stud having a shank, the dimensions of the cross-section of which shank are slightly less than the dimensions of the cross-section of the hole and having a head every radius of which is greater than the largest radius of the hole, of dividing the stud into parts capable of being individually passed through the hole, of passing each part head first through the hole and then forming the stud and partially withdrawing it until the head of the stud engages the inner edge portion of the hole to seal said hole, and of attaching clamping means on the shank to engage the outer edge portion of the hole.

4. Method of attaching a stud to edge portions of a hole formed in a thin wall while working from one side only of the wall, comprising selecting a stud having a head everywhere larger than the cross-section of the hole, and having a shank of cross-section less than the hole, threading that portion of said shank immediately adjacent the head reducing the cross-section of the remaining portion of the shank; dividing the stud longitudinally into sections capable individually of being passed through the hole and then passing the individual parts through the hole, reassembling the stud in the hole with the head contacting the inner edge portions of the hole, threading a nut on the threaded portion of the shank, introducing a collar of a relatively close fit over the reduced portion of the shank, and applying torque to both the shank and nut to thread the nut further onto the shank to clamp the edge portions of the thin wall between the nut and head of the stud.

5. Method of attaching a stud to edge portions of a hole formed in a thin wall while working from one side only of the wall, comprising selecting a stud having a head everywhere larger than the cross-section of the hole, and having a threaded shank of cross-section less than the hole; dividing the stud longitudinally into sections capable individually of being passed through the hole and then passing the individual parts through the hole, reassembling the stud in the hole with the head contacting the inner edge portions of the hole, threading a nut on the threaded portion of the shank, and securing the shank ends of the stud together so that torque applied to said stud through a torque pin to tighten the nut on the stud does not disarrange the parts of the stud.

6. A mechanical assembly for use in repairing a hollow body by plugging a hole therein while working from one side only of the body, comprising a stud having a head portion the transverse dimensions of which taken through the axis are everywhere greater than the hole, and a shank portion, said shank portion being threaded immediately adjacent the head, and smooth and reduced in diameter over the remaining part and the end of the shank portion having a hole therethrough for receiving a torque pin, said stud being divided longitudinally into four equal parts whereby each part may be passed individually through the hole being plugged; manipulating means attached to the reduced end portion of each stud, a nut for threading onto the threaded portion of the stud when the parts are properly assembled within a hole, and a collar adapted to be passed over a reduced portion of the shank to a point just below the torque pin to hold the several sections of the bolt together while torque is being applied through the torque pin.

7. A mechanical assembly for use in repairing a hollow body by plugging a hole therein while working from one side only of the body, comprising a bolt and nut assembly including a stud comprising a head portion, the transverse dimensions of which taken through the axis are everywhere greater than the hole, and a threaded shank portion having a hole in the end thereof for receiving a torque pin, said stud being divided longitudinally into several parts whereby each part may be passed individually through the hole being plugged; manipulating means attached to the reduced end portion of each stud, a nut for threading onto the threaded portion of the stud when the parts are properly assembled within a hole, and means for holding said stud parts together while torque is applied to said stud through said torque pin to tighten said nut on said stud.

8. A device for plugging a hole in the wall of a hollow body while working from one side only of the body, comprising a stud having a head, every radius of which is greater than the largest radius of said hole, and a shank portion extending from said head, every radius of said shank portion being less than the smallest radius of said hole, said stud being divided longitudinally into a plurality of sections which may be individually and successively passed through said hole, said sections being adapted to be assembled to form the stud after the sections have been passed through the hole, whereby the head of the stud engages all portions of the inner surface of said wall immediately adjacent said hole to seal hermetically said hole, and means co-acting with said stud and said wall to clamp said stud head in its wall engaging position.

9. A device for plugging a hole in the wall of a hollow body while working from one side only of the body, comprising a stud having a head, every radius of which is greater than the largest radius of said hole, and a shank portion extending from said head, every radius of said shank portion being less than the smallest radius of said hole, said stud being divided longitudinally into a plurality of sections which may be individually and successively passed through said hole, said sections being adapted to be assembled to form the stud after the sections have been passed through said hole, means on each section for manipulation thereof after the sections have been passed through said hole, whereby the head of the stud engages all portions of the inner surface of said wall immediately adjacent said hole to seal said hole, and means coacting with said stud and said wall to clamp said stud head in its wall engaging position.

CROSBY FIELD.

CERTIFICATE OF CORRECTION.

Patent No. 2,084,952.                        June 22, 1937.

CROSBY FIELD.

It is hereby certified that error appears in the printed specification of the above numbered patent requiring correction as follows: Page 2, first column, line 29, claim 1, for the word "whole" read hole; and that the said Letters Patent should be read with this correction therein that the same may conform to the record of the case in the Patent Office.

Signed and sealed this 19th day of October, A. D. 1937.

(Seal)                                                        Henry Van Arsdale.
                                                     Acting Commissioner of Patents.

a hollow body while working from one side only of the body, comprising a stud having a head, every radius of which is greater than the largest radius of said hole, and a shank portion extending from said head, every radius of said shank portion being less than the smallest radius of said hole, said stud being divided longitudinally into a plurality of sections which may be individually and successively passed through said hole, said sections being adapted to be assembled to form the stud after the sections have been passed through the hole, whereby the head of the stud engages all portions of the inner surface of said wall immediately adjacent said hole to seal hermetically said hole, and means co-acting with said stud and said wall to clamp said stud head in its wall engaging position.

9. A device for plugging a hole in the wall of a hollow body while working from one side only of the body, comprising a stud having a head, every radius of which is greater than the largest radius of said hole, and a shank portion extending from said head, every radius of said shank portion being less than the smallest radius of said hole, said stud being divided longitudinally into a plurality of sections which may be individually and successively passed through said hole, said sections being adapted to be assembled to form the stud after the sections have been passed through said hole, means on each section for manipulation thereof after the sections have been passed through said hole, whereby the head of the stud engages all portions of the inner surface of said wall immediately adjacent said hole to seal said hole, and means coacting with said stud and said wall to clamp said stud head in its wall engaging position.

CROSBY FIELD.

CERTIFICATE OF CORRECTION.

Patent No. 2,084,952. June 22, 1937.

CROSBY FIELD.

It is hereby certified that error appears in the printed specification of the above numbered patent requiring correction as follows: Page 2, first column, line 29, claim 1, for the word "whole" read hole; and that the said Letters Patent should be read with this correction therein that the same may conform to the record of the case in the Patent Office.

Signed and sealed this 19th day of October, A. D. 1937.

(Seal)

Henry Van Arsdale.
Acting Commissioner of Patents.

CERTIFICATE OF CORRECTION.

Patent No. 2,084,952.                      June 22, 1937.

CROSBY FIELD.

It is hereby certified that error appears in the printed specification of the above numbered patent requiring correction as follows: Page 2, first column, line 29, claim 1, for the word "whole" read hole; and that the said Letters Patent should be read with this correction therein that the same may conform to the record of the case in the Patent Office.

Signed and sealed this 19th day of October, A. D. 1937.

(Seal)                                Henry Van Arsdale.
                                         Acting Commissioner of Patents.